(12) United States Patent
Reza (10) Patent No.: US 9,313,084 B2
(45) Date of Patent: Apr. 12, 2016

(54) SYSTEMS AND METHODS FOR CLIENT-SIDE MEDIA CHUNKING (75) Inventor: Areef Reza, Ottawa (CA)

(73) Assignee: VUCLIP (SINGAPORE) PTE. LTD., Singapore (SG)

( * ) Notice: Subject to any disclaimer, the term of this patent is extended or adjusted under 35 U.S.C. 154(b) by 280 days.

(21) Appl. No.: 13/820,434

(22) PCT Filed: Sep. 1, 2011

(86) PCT No.: PCT/CA2011/050534
§ 371 (c)(1),
(2), (4) Date: May 13, 2013

(87) PCT Pub. No.: WO2012/037671
PCT Pub. Date: Mar. 29, 2012

(65) Prior Publication Data
US 2013/0232233 A1 Sep. 5, 2013

Related U.S. Application Data (60) Provisional application No. 61/379,199, filed on Sep. 1, 2010.

(51) Int. Cl.
H04L 12/66 (2006.01)
H04L 29/08 (2006.01)
H04N 21/84 (2011.01)
H04N 21/845 (2011.01)
H04N 21/854 (2011.01)
H04N 19/61 (2014.01)

(52) U.S. Cl.
CPC .......... *H04L 29/08117* (2013.01); *H04N 19/61* (2014.11); *H04N 21/84* (2013.01); *H04N 21/8456* (2013.01); *H04N 21/85406* (2013.01)

(58) Field of Classification Search
CPC ... H04L 29/08117; G06F 15/16; H04N 11/02
See application file for complete search history.

(56) References Cited

U.S. PATENT DOCUMENTS

2003/0061369 A1* 3/2003 Aksu et al. ..................... 709/231
2006/0064716 A1* 3/2006 Sull et al. ......................... 725/37
2010/0080290 A1* 4/2010 Mehrotra ................. 375/240.07

(Continued)

FOREIGN PATENT DOCUMENTS

WO 2010042859 4/2010
WO 2010078281 7/2010

OTHER PUBLICATIONS

International Search Report (PCT/CA2011/050534) Jan. 17, 2012.

*Primary Examiner* — Nicholas Taylor
*Assistant Examiner* — Sanjoy Roy
(74) *Attorney, Agent, or Firm* — Lynn C. Schumacher; Stephen W. Leonard; Hill & Schumacher (57) ABSTRACT A computer implemented method of downloading one or more chunks of a selected media file from a server to a computing device is provided. A client application resides on the computing device and is configured to obtain a metadata file describing how the selected media file may be chunked, to determine, based on the metadata file, the portion of the selected media file to download, and to download the portion. The client application prepares a local media file corresponding to one or more chunks of the downloaded portion of the selected media file, and facilitates playback of the local media file on the computing device. The time interval of the chunk may be selected based on a suitable chunk time interval for the computing device.

19 Claims, 6 Drawing Sheets

(56) References Cited

U.S. PATENT DOCUMENTS

| | | |
|---|---|---|
| 2010/0161825 A1* | 6/2010 | Ronca et al. ............... 709/231 |
| 2010/0169458 A1* | 7/2010 | Biderman et al. ............ 709/219 |
| 2010/0180043 A1* | 7/2010 | Lau et al. .................... 709/231 |
| 2010/0262711 A1* | 10/2010 | Bouazizi ..................... 709/231 |

* cited by examiner

```
'moov' - Movie
    'mvhd' - Movie Header
    'trak' - Track
        'tkhd' - Track Header
        'mdia' - Media
            'mdhd' - Media Handler Header
                flags       00000000    createTime  12/31/69 7:00:00 PM   quality          0
                timeScale          7    modTime     12/31/69 7:00:00 PM   language     21956
                duration         421
            'hdlr' - Handler Description
            'minf' - Media Information
                'vmhd' - Video Media Header
                'dinf' - Data Handler Information
                    'dref' - Data Reference
                'stbl' - Sample Table
                    'stsd' - Sample Descriptions
                    'stts' - Sample to Time
                        flags       $00000000  numEntries        1 sampCnt     sampDur
                              421         1
                    'stss' - Sync Samples
                    'stsc' - Sample to Chunk
                        flags       $00000000  numEntries        1

1st Chunk   samp/chunk desc ID
                              1           1             1
                    'stsz' - Sample Sizes
                    'stco' - Chunk Offset Table
                        flags       $00000000  numEntries      421
```

|    |       |       |       |       |       |       |
|----|-------|-------|-------|-------|-------|-------|
| 1  | 48    | 4216  | 4498  | 4805  | 5165  | 5550  |
| 7  | 6027  | 6461  | 7017  | 7833  | 8437  | 9012  |
| 13 | 9507  | 12696 | 13003 | 13371 | 16125 | 16528 |
| 19 | 17190 | 17783 | 18408 | 18999 | 19788 | 20547 |
| 25 | 21145 | 23446 | 24111 | 24786 | 25431 | 26421 |
| 31 | 27226 | 27837 | 28400 | 29127 | 29724 | 30279 |
| 37 | 30796 | 33052 | 33383 | 35364 | 36955 | 38868 |
| 43 | 40050 | 41426 | 43260 | 44999 | 46449 | 47669 |
| 49 | 48849 | 51695 | 53074 | 54385 | 55767 | 56854 |
| 55 | 57998 | 59056 | 59841 | 60626 | 61615 | 62432 |

Figure 4(a)

```
'moov' - Movie
  'mvhd' - Movie Header
  'trak' - Track
  'trak' - Track
    'tkhd' - Track Header
    'mdia' - Media
      'mdhd' - Media Handler Header
        flags      00000000   createTime  12/31/69 7:00:00 PM   quality     0
        timeScale       8000  modTime     12/31/69 7:00:00 PM   language    21956
        duration      481280
      'hdlr' - Handler Description
      'minf' - Media Information
        'smhd' - Sound Media Header
        'dinf' - Data Handler Information
          'dref' - Data Reference
        'stbl' - Sample Table
          'stsd' - Sample Descriptions
            flags      $00000000 numEntries    1
            descSize         75  numChannels       2   version     0
            dataFormat     mp4a  sampleSize       16   revlevel    0
            dataRefIndex      1  sampleRate   8000.0   vendor      0
            packetSize        0  compressionID     0
          'stts' - Sample to Time
            flags      $00000000 numEntries    1
              sampCnt   sampDur
                  470      1024
          'stsc' - Sample to Chunk
          'stsz' - Sample Sizes
          'stco' - Chunk Offset Table
            flags      $00000000 numEntries   470
```

|    |       |       |       |       |       |       |
|----|-------|-------|-------|-------|-------|-------|
| 1  | 3926  | 3974  | 4230  | 4571  | 4920  | 5303  |
| 7  | 5773  | 6194  | 6756  | 7292  | 7568  | 8179  |
| 13 | 8743  | 9264  | 12441 | 12762 | 13110 | 15898 |
| 19 | 16299 | 16698 | 16951 | 17543 | 18170 | 18780 |
| 25 | 19542 | 20306 | 20915 | 23235 | 23694 | 23904 |
| 31 | 24537 | 25189 | 26191 | 27008 | 27645 | 28205 |
| 37 | 28899 | 29532 | 29919 | 30097 | 30575 | 32848 |
| 43 | 33182 | 35157 | 36711 | 38643 | 39841 | 41237 |
| 49 | 42818 | 43066 | 44804 | 46235 | 47461 | 48624 |
| 55 | 51469 | 52868 | 54164 | 55301 | 55558 | 56643 |

SYSTEMS AND METHODS FOR CLIENT-SIDE MEDIA CHUNKING

CROSS-REFERENCE TO RELATED APPLICATION

This application is a National Phase application claiming the benefit of No. PCT/CA2011/050534 filed on Sep. 1, 2011, in English, which further claims priority to U.S. Provisional Application No. 61/379,199, titled "SYSTEMS AND METHODS FOR CLIENT-SIDE MEDIA CHUNKING" and filed on Sep. 1, 2010, the entire contents of which are incorporated herein by reference.

BACKGROUND

The present disclosure relates to systems and methods for streaming media content, and more particularly, this disclosure relates to systems and methods for chunking streamed media content.

Progressive downloading is commonly used for streaming media from a server to a client application. Using progressive download, a client video player can start playing a video clip even before the clip has been fully downloaded. Some progressive download methods require the input file to be segmented into a number of chunks, where each chunk represents an independent media file to be downloaded from the server. A media player capable of playing such chunked files can download and play the chunked media files one after another in a streaming session. Apple's HTTP Live Streaming System is an example of such an approach. In another example, progressive downloading and chunking is employed on certain mobile devices (such as many Nokia Series 40 phones), where it is not possible to play a large video file over HTTP due to the small memory footprint of the device. For such devices, chunking large video clips into multiple chunks and playing them separately is a viable progressive download and playback option.

Unfortunately, the chunk size, which is determined at the server, may not be common for all device types. For example, Apple HTTP Live Streaming recommends a chunk size of 10 seconds. Such small chunk size however does not play well on feature phones using a similar technique.

Furthermore, when downloading files over HTTP, it is not possible to download more than one file at a time using the same HTTP connection on most feature phones. Tearing down and setting up new HTTP connections for each of the chunks is less efficient than the alternate approach of using the same HTTP connection to download arbitrary number of chunks.

SUMMARY

A computer implemented method of downloading one or more chunks of a selected media file from a server to a computing device is provided. A client application resides on the computing device and is configured to obtain a metadata file describing how the selected media file may be chunked, to determine, based on the metadata file, the portion of the selected media file to download, and to download the portion. The client application prepares a local media file corresponding to one or more chunks of the downloaded portion of the selected media file, and facilitates playback of the local media file on the computing device. The time interval of the chunk may be selected based on a suitable chunk time interval for the computing device.

Accordingly, in one aspect, there is provided computer implemented method of downloading and preparing one or more chunks of a selected media file for playback on a computing device, comprising the steps of: determining a suitable time interval of a chunk for media playback on the computing device; receiving input selecting a media segment; identifying a location of a selected media file containing the media segment and a location of a metadata file associated with the selected media file, the metadata file including metadata describing a format of the selected media file; downloading the metadata file; determining, based on the metadata file and the media segment, a portion of the selected media file to download, wherein the portion of the selected media file has a time offset, and wherein a time duration of the portion of the selected media file is greater than or equal to that of one or more chunks; downloading the portion of the selected media file; preparing one or more local media files from the portion of the selected media file, wherein each local media file includes one chunk; and determining, based on the metadata file, a suitable header for each local media file, and prepending the each header to each local media file.

In another aspect, there is provided a computer-readable storage medium comprising instructions for downloading one or more chunks of a selected media file to a computing device, wherein execution of the instructions by one or more processors of the computing device causes the one or more processors to carry out the steps of: determining a suitable time interval of a chunk for media playback on the computing device; receiving input selecting a media segment; identifying a location of a selected media file containing the media segment and a location of a metadata file associated with the selected media file, the metadata file including metadata describing a format of the selected media file; downloading the metadata file; determining, based on the metadata file and the media segment, a portion of the selected media file to download, wherein the portion of the selected media file has a time offset, and wherein a time duration of the portion of the selected media file is greater than or equal to that of one or more chunks; downloading the portion of the selected media file; preparing one or more local media files from the portion of the selected media file, wherein each local media file includes one chunk; and determining, based on the metadata file, a suitable header for each local media file, and prepending the each header to each local media file.

In another aspect, there is provided a computer implemented method of uploading, from a server, one or more chunks of a selected media file to a computing device, comprising the steps of: receiving, from the computing device, a request to upload a metadata file associated with a media file, the metadata file including metadata describing a format of the selected media file; uploading the metadata file to the computing device; receiving a request to upload a portion of the media file to the computing device, the portion of the media file corresponding to one or more chunks suitable for playback on the computing device, the chunk size being specified by the computing device; and uploading the portion of the media file to the computing device.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 4 shows a portion of the movie section of a MP4 file, including (a) a portion of the video track and (b) a portion of the audio track.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

Figure 1:
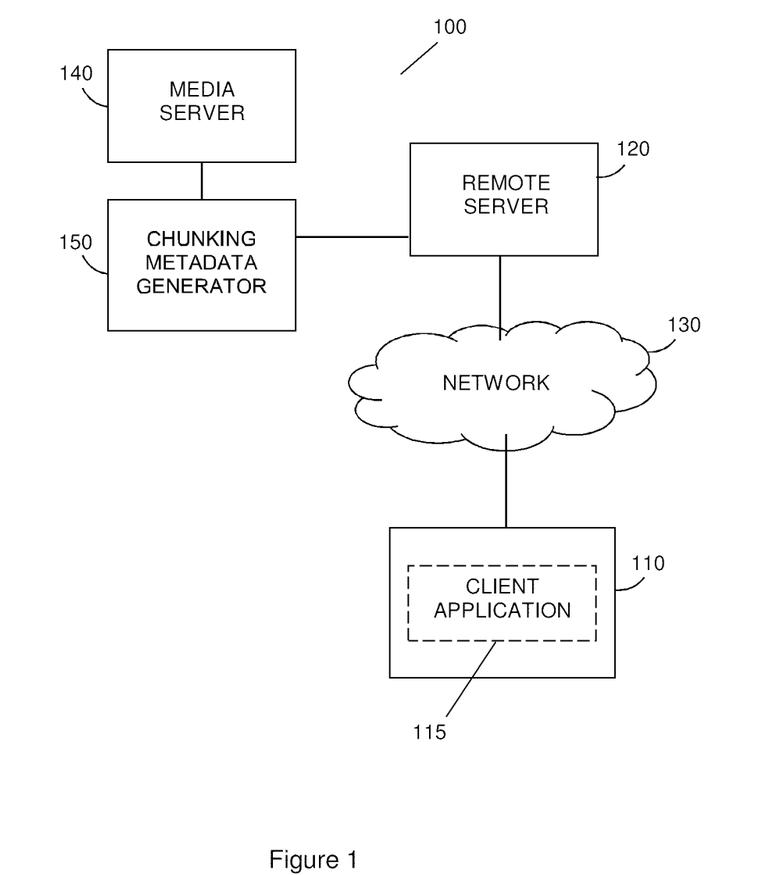
FIG. 1 illustrates a system for client side chunking of a progressively downloaded media file.

Referring to FIG. 1, a system is shown for client-side chunking of a progressively downloaded media file for media playback on a computing device with greater resiliency. The system includes a computing device 110 which runs client application 115 and communicates with server 120 through network 130 for the progressive downloading of a media file.

The media file, which may been coded according to a codec for efficient transport, may reside on remote server 120, or may be provided to by media server 140. A chunking metadata generator application 150, which may reside on media server 140, remote server 120, or another remote computing device, generates metadata specifying how a given media file may be chunked according to different chunk sizes based on the encoding scheme of the media file. Remote server 120 may be any server capable of providing the media file via progressive download, including, but not limited to, a web server and a file transfer protocol (FTP) server.

As described further below, unlike known server-side chunking methods, the chunking of the media file during progressive download to computing device 110 is determined by client application 115. Client application 115 downloads the metadata file and then progressively downloads selected chunks of the media file based on the chunking information provided in the metadata file.

Figure 2:
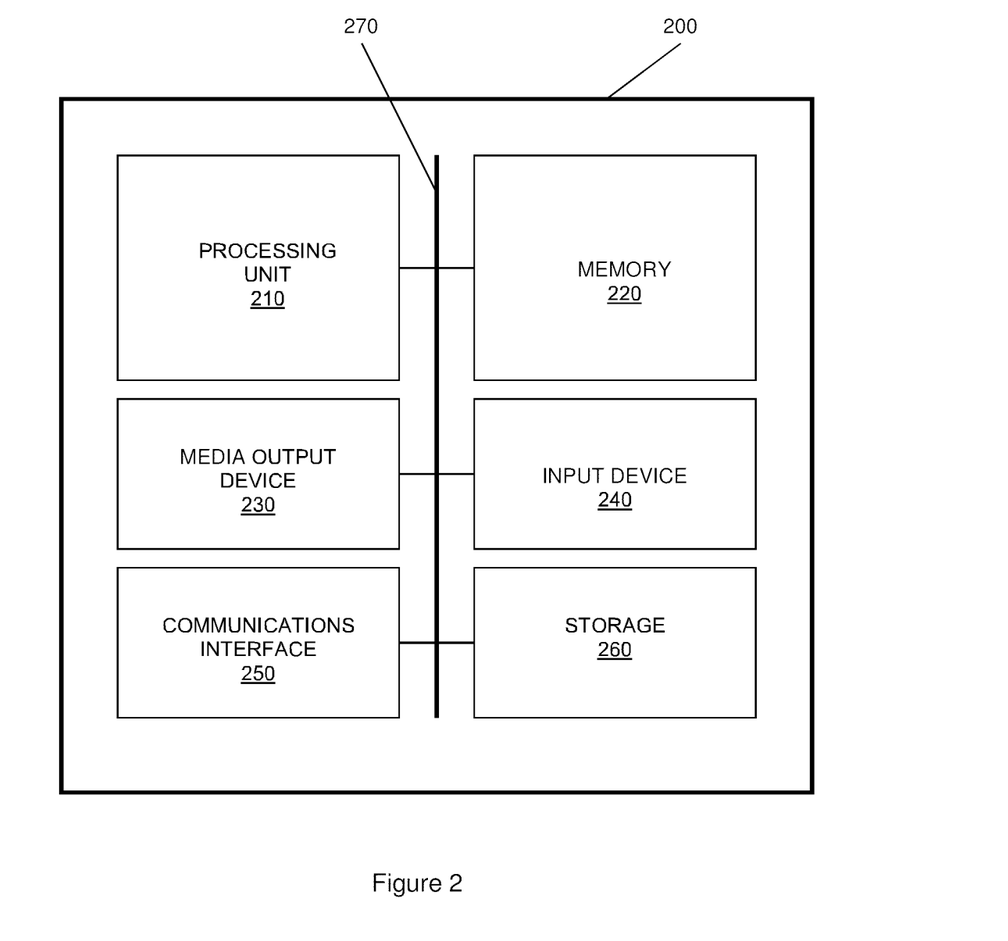
FIG. 2 is a block diagram illustrating a computing device suitable for performing the methods described herein.

FIG. 2 illustrates an example of a computing device 200 for implementing various embodiments disclosed herein. The present illustration is not intended to suggest any limitation as to scope of use or functionality, as the systems and methods may be implemented in diverse general-purpose or special purpose computing environments. In some example implementations, computing device 200 may be a mobile computing device capable of media playback, such as a feature phone, a smart phone, a tablet, a netbook, and a laptop computer.

Computing device 200 includes at least one processing unit 210 and memory 220. Processing unit 210 executed computer-executable instructions and may comprise one or more processors. In a multi-processing system, multiple processors execute computer-executable instructions for increased processing power. Memory 210 may be volatile memory (e.g., registers, cache, RAM), non-volatile memory (e.g., ROM, EEPROM, flash memory, etc.), or a combination thereof. Software is stored in memory 210 for implementing the methods described in the proceeding embodiments.

Computing device 200 may include additional features. Computing device 200 may include one or more media output devices 230, one or more input devices 240, and one or more communication interfaces or connections 250. Computing device 200 may further include a storage unit or apparatus 260, which may be removable or non-removable. For example, storage unit or apparatus 260 may include magnetic disks, magnetic tapes or cassettes, CD-ROMs, DVDs, or any other medium which can be used to store information and which can be accessed within the computing device 200.

An interconnection mechanism interconnects the components of the computing environment. An example interconnection mechanism is shown as bus 270. Typically, operating system software such as J2ME (not shown) provides an operating environment for other software (e.g. APIs) executing in the computing device 200, and coordinates activities of the components of the computing device 200.

Media output device 230 may be a display, speaker or another media device that provides media output from the computing device 200. Input device 230 may be a touch input device such as a keyboard, mouse, pen, or trackball, a voice input device, a scanning device, or another device that provides input to the computing device 200.

Communication interface 250 enables communication over a communication medium to another computing entity, such as remote server 130 in FIG. 1. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The systems and methods can be described in the general context of computer-readable media. Computer-readable media are any available media that can be accessed within a computing environment. By way of example, and not limitation, with the computing device 200, computer-readable media include memory 220, storage unit or apparatus 260, communication media, and combinations of any of the above.

The systems and methods can be described in the general context of computer-executable instructions, such as those included in program modules, being executed in a computing environment on a target real or virtual processor. Generally, program modules include routines, programs, application programming interfaces, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

Figure 3:
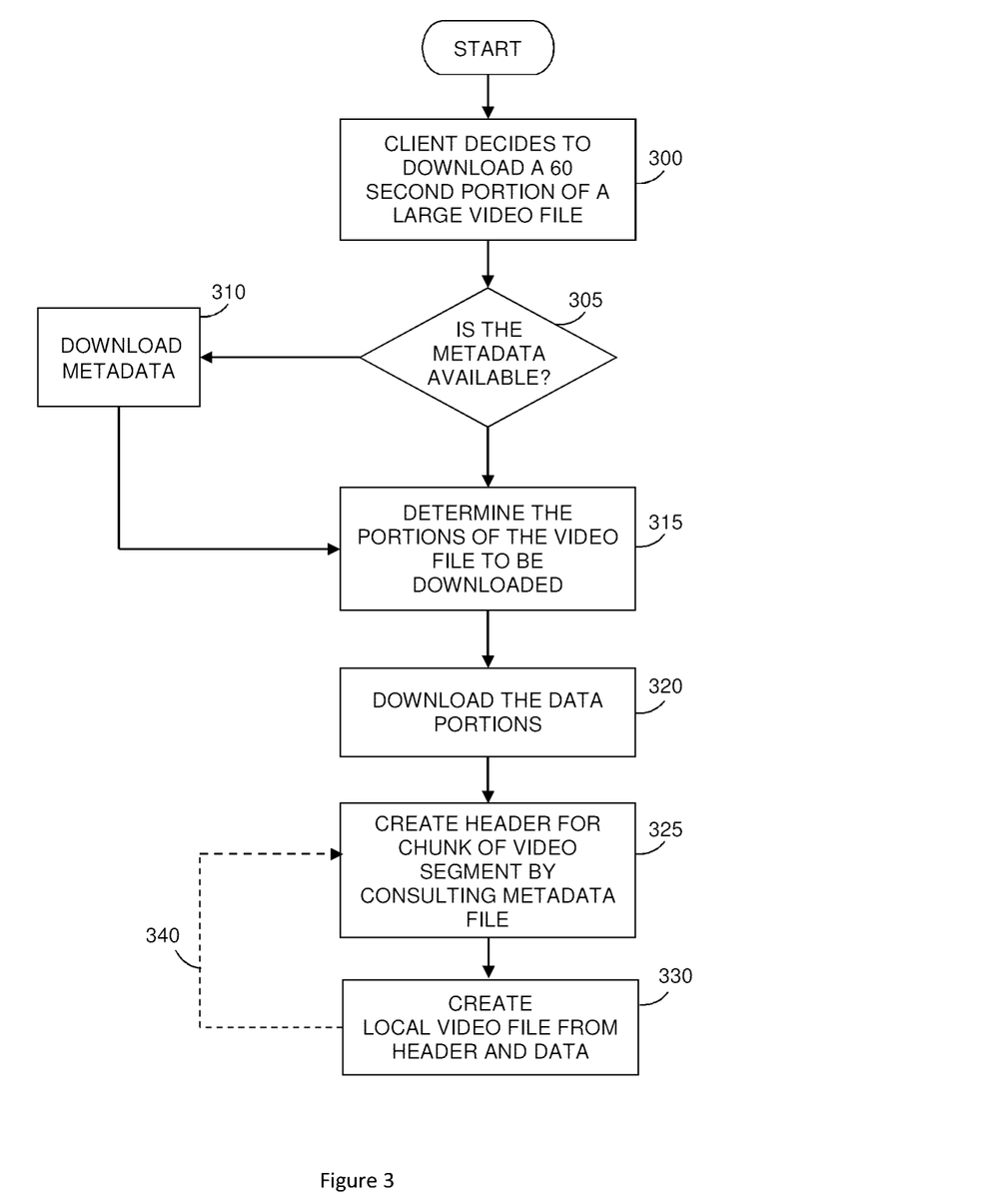
FIG. 3 is a flow chart illustrating a method of streaming a media file to a computing device in which the chunking of the media file is determined by a client application based on metadata.

FIG. 3 provides a flowchart describing a method in which progressive download is employed to download a media file, and client-side chunking is utilized to select a chunk interval that is appropriate for and tailored to the computing device.

Chunking the media file into appropriate multiple segments is typically based on knowledge of the codec and CPU power of the computing or media playback device. To support client-side chunking, a metadata file that provides sufficient metadata to enable the downloading of a portion of the media file, such that the portion of the media file corresponds to at least one chunk of the selected chunk size. The metadata file may be stored at the remote server with the media file, but may also be pre-downloaded or otherwise provided or made available to the computing device.

In one embodiment, the media file residing on the server is provided in an interleaved format to support the chunking of the media file for progressive download. Generally speaking, the process of interleaving involves storing alternatively storing the audio and video in the media file. For example, an interleaved audio/video media file may include N milliseconds of video samples, followed by N milliseconds of audio samples, followed by N milliseconds of video samples, etc. Interleaving is advantageous in that it reduces disk accesses, playback buffer requirements and enables progressive download and playback. It will be known to those skilled in the art that there are presently many tools available that are suitable for producing an interleaved media file, such as MP4Box (http://gpac.wp.institut-telecom.fr/mp4box/). For example, running the following command will interleave a test.mp4 file so that its video and audio data are stored close to each other: "MP4Box -inter 500 test.mp4".

Referring again to FIG. 3, in step 300, the client application, having been instructed to download a media file, or a segment of a media file (illustrated in the Figure as a video file), by a user operating the computing device (for example, through a user interface residing on the computing device), determines a suitable chunk size based on the device capability and/or known performance characteristics, or pre-configured settings, and a optionally a selected time offset within the media file.

The selection of the media file, or segment of the media file, may be made by downloading a list of available media files and presenting the list of media files to the user on a user interface. The time offset within the media file is determined by the starting time point of the media file or media segment as selected by the user. The location of the media file is provided to the computing system.

The suitable chunk size for a given level of media playback performance is dependent on the device characteristics. For example, experiments have shown that a chunk size of 60 seconds provides a better quality of user experience on J2ME-based feature phones, and for which case a 60 second chunk duration is selected (this example implementation is shown in FIG. 3). In other examples, while an iPhone device has been found to provide better playback with a chunk size of about 10 seconds, it has been found that Nokia feature phones provide improved playback with a chunk size of about 60 seconds. Accordingly, the chunk size may be selected based on the anticipated and/or measured device capability and performance.

In step 305, the client application determines whether or not metadata is available regarding how to chunk the media file. If the metadata is not already available, the metadata is downloaded from the remote server in step 310, based on input providing the location of the metadata file.

The downloaded metadata is then utilized to determine the portion of the media file to be downloaded in step 315, where the portion to be downloaded may correspond to the desired chunk, or multiple chunks, as further described below. The client application determines the portion of the media file to be downloaded based on the information provided in the metadata file, which provides the information for chunking up the media file into appropriate sizes without requiring any knowledge of the underlying codec used to encode the media file. The portion to be downloaded is then downloaded in step 320.

The downloaded portion of the media file is subsequently prepared for playback on the computing device. This step is performed, as shown in step 325, by creating an appropriate header for the media segment based on the information provided in the metadata file. Finally, in step 330, a local media file is created by incorporating a file header including all the mandatory information that is required for constructing the local media file (e.g. the metadata required for producing a 3gp or MP4 file). If the portion of the media file included multiple chunks, one local media file is generated for each chunk. This process may then be repeated to download multiple portions or chunks of a large media file, and, optionally, to enable to playback of the entire selected media file or the segment of the selected media file.

The content of the metadata file depends on the format of the video file container. For example, in some example cases, the video may be encoded according to mp4 or 3gp formats. In the case of the mp4 file type, the information contained in the metadata file may include the total duration of the clip, the position of all key frames, the time scale, and the decoding time stamps.

In one embodiment, the metadata file includes information contained within the original media file, and this information may be employed by the client to regenerate a complete media file from a fragment of raw data. The metadata file will depend on the type of the video container.

It is to be understood that the portion of the media segment that is downloaded by the computing device need not be equal to the chunk size, and that the computing device may subsequently chunk the downloaded portion of the media file into multiple local files for playback (as individual chunks) after having downloaded the portion of the media file. For example, if a suitable chunk size for the computing device is 60 seconds, the computing device can download a portion of the media file that exceeds this chunk size. In one example, the computing device may download a 120 second portion of raw audio/video data from the media file before performing a chunking step (involving the computing of headers and the creation of local media files). In the present example, the computing device could create two 60-second chunks from a 120 second portion of the media file. Furthermore, in an extension of this example, the computing device could begin progressively downloading the 120 second file, and create the first chunk after 60 seconds and initiate playback, and then create the second chunk after having downloaded the remaining 60 seconds.

For example, referring to FIG. 3, the portion of the media file downloaded in step 320 may encompass a time interval spanning multiple chunks. Accordingly, the steps of creating a local media file (steps 325 and 330) may be performed multiple times, as indicated by optional step 340, in order to chunk the downloaded portion of the media file into multiple local media files of a selected chunk size.

This embodiment enables the client application to download an arbitrary amount of data over a connection (such as a single HTTP connection) before chunking the portion of the media file. This modality of downloading subsequently chunking on the client side of the network is achievable since it is only the raw audio/video data of the media file that is downloaded (apart from the metadata file), thus enabling the client application to arbitrarily chunk the downloaded media portion at the client side.

In one embodiment, this modality enables the computing device to download as much raw data as desired (or as possible) over a single HTTP connection and then create the header with all or some of the raw data. In the next HTTP connection, one may then again download as much as possible. An additional benefit of this method is that a minimal number of HTTP sessions are required to stream an entire media clip. This optimizes the connection setup time for low power devices.

It is to be understood that the downloaded raw media data need not be equivalent to the time interval of one or more chunks (i.e. the temporal boundaries of the downloaded media portion need not coincide with the temporal boundaries of one or more adjacent chunks). The downloaded portion need only overlap at least one chunk time span, such that a local media file spanning at least one chunk may be created (based on the information in the metadata file). This may be contrasted with the modality of Apple HTTP live streaming, where all chunks are already created at the server side as separate files, and where each file needs to be downloaded in separate HTTP sessions.

It is also to be noted that the steps of downloading raw data and creating the header portion of the local media files do not need to occur in a given sequential order, as the computing device may prepare the header portions at any time after the metadata file is available.

Figure 4A:
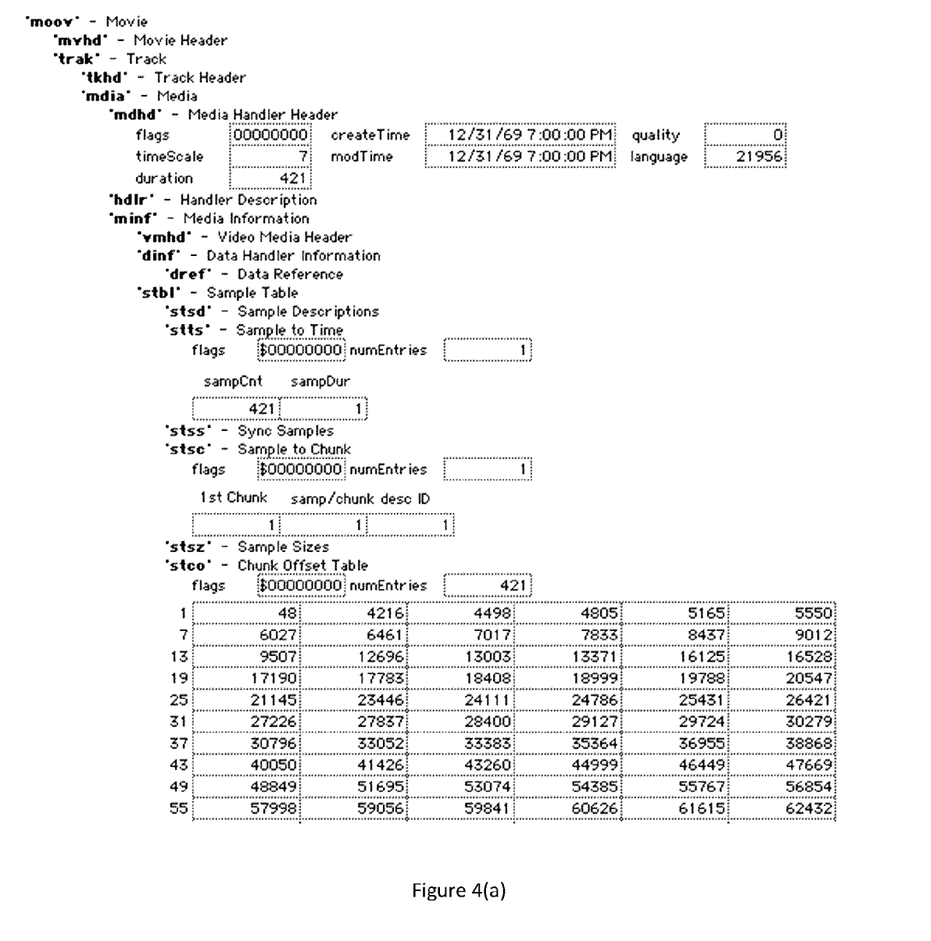
Figure 4B:
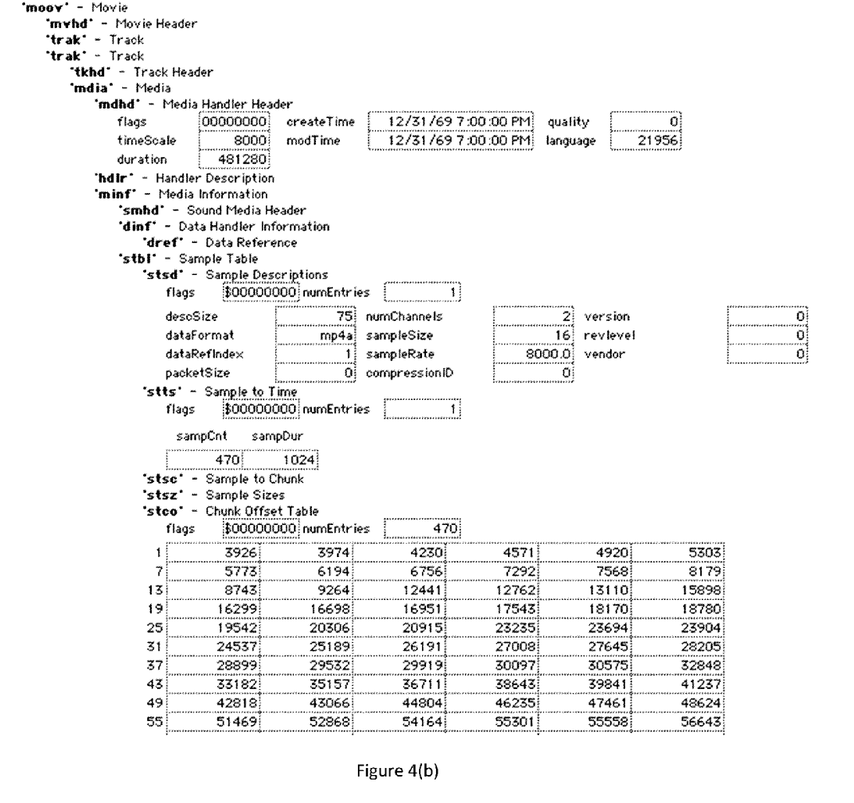

In one example implementation, the media file is provided using MP4 as the video container format. FIGS. 4(a) and 4(b) show some of the relevant attributes of an example MP4 video file that may be included in the metadata file. In an MP4 file, audio and video headers are captured in different tracks. Each of these tracks point to the raw media data using a number of hierarchical tables (atoms). Both video and audio data are stored as a series of samples with one table (stsz) indicating the size of each sample and another table (stco) offset of the raw data in the file. Also the time scales of both video and audio data are also available within their track atom.

FIGS. 4(a) and 4(b) illustrate a portion of the structure of the "moov" or "movie" atom of a MP4 file. The movie atom generally contains metadata information, and provides references to, but does not actually contain, the sample data. As can be seen in the Figure, the movie atom contains a movie header atom (a mvhd atom), which is provided to define the display characteristics and timescale and duration information for the entire movie. The movie atom can also be seen to contain a track (trak) atom associated with each track of the movie.

FIG. 4(a) shows the metadata in the movie atom corresponding to the video track of the MP4 file, while FIG. 4(b) shows the metadata in the audio track. Each track atom further includes media atoms (the mdia atom) and other atoms that define other track and movie characteristics, which are not shown in FIGS. 4(a) and 4(b) for brevity. Both tracks include the "stco" atom, which provides a table describing the offsets of the chunks making up the MP4 file.

In one example embodiment, the structure of the metadata file is a standard XML file with media related attributes. An example of this embodiment is shown below, where a suitable metadata file based on the MP4 file format shown in FIG. 4 is generated as follows:

```
<metadata>
  <video>
    <timescale>7</timescale>
    <duration>421</duration>
    <samplecount>421</samplecount>
    <sampledur>1</samledur>
    <samplesizes>3878, 14, 73, ... </samplesizes>
    <sampleoffsets>48, 4216, 4498, ... </sampleoffsets>
  </video>
  <audio>
    <timescale>8000</timescale>
    <duration>481280</duration>
    <samplecount>470</samplecount>
    <sampledur>1024</samledur>
    <samplesizes>48, 242, 268, ... </samplesizes>
    <sampleoffsets>3926, 3974, 4230, ... </sampleoffsets>
  </audio>
</metadata>
```

This metadata file, which describes key aspects of the media MP4 file, may be employed by the client application to determine the portions of the file to be downloaded (step 315), and to form the header portion of the local media file for the downloaded media segments to enable playback (step 325). It is to be understood that the header portion of the local media file, which is generated based on the metadata file and the known file type of the media file, includes all required information, components or atoms that are needed to complete the local media file such that it is playable. In one example implementation, the client application may provide one or more static atoms according to the known type of the media file. In another example implementation, one or more static atoms may be provided in the metadata file.

The metadata may be captured in various formats including XML, JSON, or any binary notation. The above XML fragment is provided only as an example. Furthermore, although the preceding example implementation employed MP4 as the example media container, it is to be understood that the method may also be applied to other media container formats, such as, but not limited to, AVI, Flash Video (FLV, F4V), Quick Time file format, Ogg, MPEG program stream, MPEG-2 transport stream, etc.

With the above metadata available to the client, the client can selectively download raw media data between any start and end time period and recreate a new header. The steps of determining which portion of raw data to download are described in the flow chart shown in FIG. 5.

Figure 5:
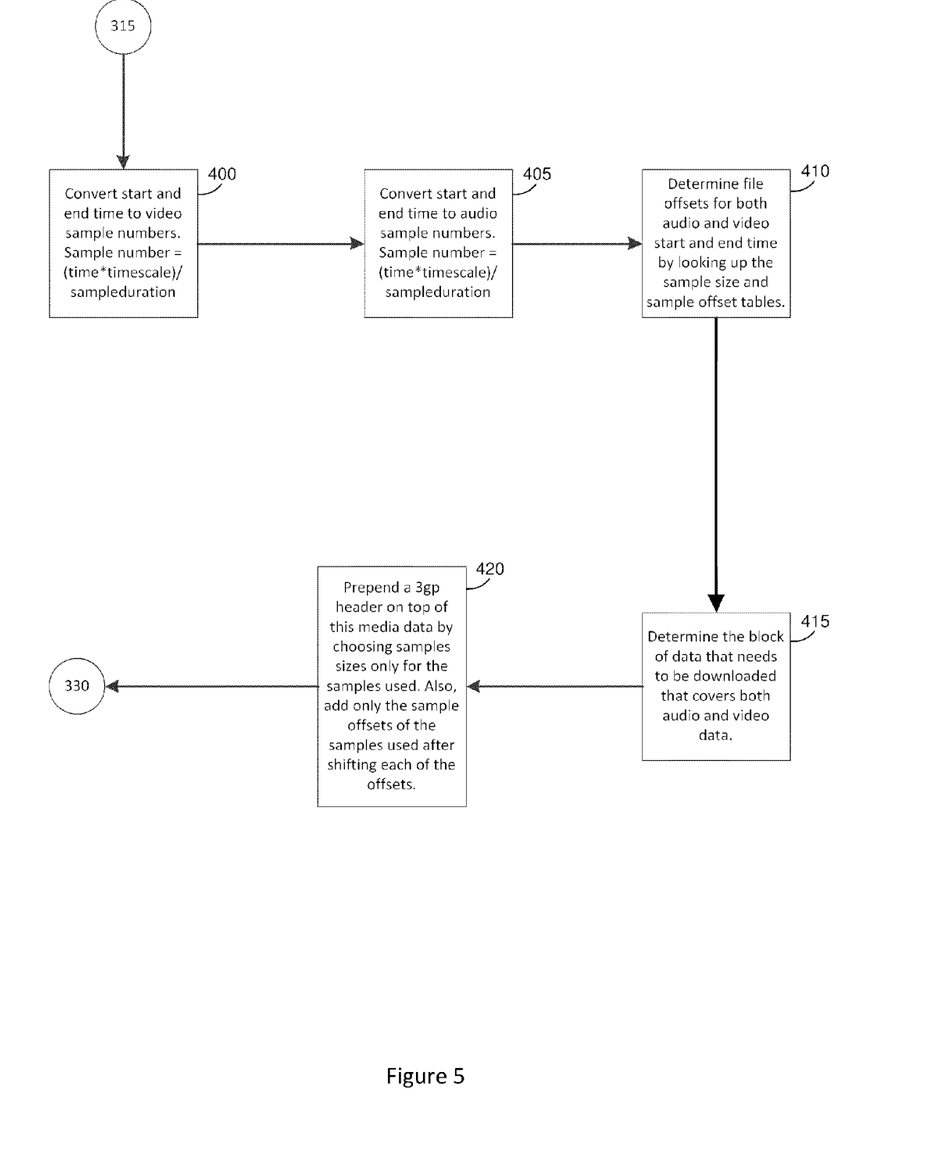
FIG. 5 is a flow chart illustrating the steps that are performed when determining which portion of a media file to download, as per the information provided in the metadata file.

In step 400, after having determined the portions of the video file to be downloaded in step 315, the metadata file is employed to convert the start and end time of the video sample numbers, where a sample number is obtained by dividing the product of the time and timescale by the sample duration. Having determined the start and end sample numbers, the preceding step is repeated for the audio sample numbers in step 405. In step 410, the file offsets for the audio and video start and end times are determined based on the sample size and sample offset tables. In step 415, the required block of data to be downloaded (including both audio and video portions) is determined based on the sample numbers and offsets identified in the preceding steps. Having determined the block of data to download and downloaded the data block, a header is prepared in step 420 (as in step 325) and prepended on the data block to provide a suitable form of a media segment for playback on the computing device. The header thus created only includes sample size and sample offset information of the relevant samples; in other words, the sample size and sample offset information included in the header refers to the raw data that make up the one or more chunks and not necessarily other portions of the raw data that is not downloaded. Since only a portion of the raw data is downloaded, each of the sample offsets needs to be adjusted so that the first sample offset refers to the first block of raw data in the chunk.

For example, if a chunk needs to be created between a time interval spanning 10 seconds to 20 seconds relative to a start of a given MP4 (or 3gp) file for the example file header shown above, the following steps are followed:

1. Video sample number at time 10=(10*7)/1=70
2. Video sample number at time 20=(20*7)/1=140
3. File offset for video sample #70=76039 (the 70th entry in the sample offset; not shown in the figure for brevity)
4. File offset for video sample #140=136183
5. Add size of the 140th video sample to the above to get the final offset=136183+301=136484. The sample size is taken from the 140th entry in the video sample sizes (not shown in figure for brevity).
6. Audio sample number at time 10=(10*8000)/1024=78.
7. Audio sample number at time 20=(20*8000)/1024=156.
8. File offset for audio sample #78=75867 (the 78th entry in the sample offset)
9. File offset for audio sample #156=135937
10. Add size of the 156th audio sample to the above to get the final offset=135937+246=136183. The sample size is taken from the 156th entry in the audio sample sizes.
11. The start file offset to download from=min(video start offset, audio start offset)=min(76039, 75867)=75867
12. The end file offset to download from=max(video end offset, audio end offset)=max(136484, 136183)=136484
13. Client will download raw data from the MP4 file starting from offset 75867 and ending at 136484.
14. To generate the MP4 header, the client will only use the entries between 70 and 140 for video sample sizes; entries between 78 and 156 for audio sample sizes.
15. The client will only use the entries between 70 and 140 for video offsets after deducting the start data file offset of 75867.
16. The client will only use the entries between 78 and 156 for audio offsets after deducting the start data file offset of 75867.

Having determined the relevant parameters of the downloaded portion of the media file, a header for the local media file may be created. As noted above, the header portion of the local media file includes all necessary atoms to support playback of the local media file. In one example embodiment, the header may be obtained by modifying the header portion of the original media file to specify the downloaded portion of the media file, using the information determined in the preceding steps. As described above, the downloaded portion of the media file may be chunked into one or more local media files for playback as chunks.

Chunking the downloaded media file in real time at the client side provides many advantages. Most importantly, it allows the client application to determine and select a suitable and/or optimal chunk size to employ. Furthermore, a traditional web server can be used to statically deliver the media files and the associated metadata file. Since no dynamic application logic is required at the server side, this results in a highly scalable server solution which can benefit from content delivery network solutions such as Akamai.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A computer implemented method of downloading and preparing one or more chunks of a selected media file for playback on a client computing device, comprising the of the following steps that are performed by the client computing device:
   a) identifying a pre-selected client-side chunk time interval for media playback on the computing device;
   b) receiving input selecting a media segment;
   c) identifying a location of a selected media file containing the media segment;
   d) identifying a location of a metadata file associated with the selected media file, the metadata file including metadata specifying how the media file may be chunked according to different chunk sizes based on the encoding scheme of the media file;
   e) downloading the metadata file;
   f) determining, based on the metadata file and the media segment, a portion of the selected media file to download, wherein the portion of the selected media file has a time offset, and wherein a time duration of the portion of the selected media file is greater than or equal to that of one or more chunks;
   g) downloading the portion of the selected media file;
   h) preparing one or more local media files from the portion of the selected media file, wherein each local media file includes one chunk; and
   i) determining, based on the metadata file, a suitable header for each local media file, and prepending the each header to each local media file;
   wherein pre-selected client-side chunk time interval is identified in absence of input from the server;
   wherein the pre-selected client-side chunk time interval is specific to the type of client computing device, and
   wherein the pre-selected client-side chunk time interval is based on a relationship between chunk time interval and playback quality for the type of client computing device.

2. The method according to claim 1 further comprising the step of playing the one or more local media files on the client computing device.

3. The method according to claim 1 further comprising repeating steps e) to h) one or more times.

4. The method according to claim 3 wherein portions of the metadata file are sequentially downloaded for streaming the selected media segment of the selected media file on the client computing device.

5. The method according to claim 3 wherein steps d) to g) are repeated a sufficient number of times to download the full media segment.

6. The method according to claim 1 wherein the selected media file includes a plurality of samples, and wherein the metadata file includes temporal information associated with each sample of the plurality of samples, and wherein the step of identifying the portion of the selected media file to download includes identifying a data block including a range of samples corresponding to the client-side chunk time interval and the time offset.

7. The method according to claim 6 wherein the selected media file includes both audio data and video data, and wherein the data block includes both the range of audio sample and the range of video samples corresponding to the client-side chunk time interval and the time offset.

8. The method according to claim 1 wherein the portion of the media segment that is downloaded by the client computing device includes two or more chunks.

9. The method according to claim 1 wherein one or more temporal boundaries of the portion of the media segment that is downloaded by the client computing device does not coincide with the temporal boundaries of a chunk.

10. The method according to claim 1 wherein the portion of the media segment that is downloaded by the client computing device is not be equal to the chunk size or a multiple thereof.

11. The method according to claim 1 wherein the selected media file is an MP4 file and wherein the metadata file includes sample information provided in the movie atom of the MP4 file.

12. The method according to claim 1 wherein the selected media file and the metadata file are located on a server, and wherein the step of downloading the metadata file includes the step of downloading the metadata file from the server.

13. The method according to claim 1 further comprising the step of receiving input selecting the selected media file from a list of media files.

14. The method according to claim 13 further comprising the step of downloading the list of media files to the client computing device and presenting the list of media files to a user for selection.

15. The method according to claim 1 wherein the selected media file includes interleaved audio and video data.

16. The method according to claim 1 wherein the step of downloading the portion of the selected media file includes progressively downloading the portion of the selected media file.

17. The method according to claim 1 wherein client computing device on which the input is received is a feature phone.

18. The method according to claim 1 wherein the step of downloading the portion of the selected media file includes downloading the portion of the selected media file from one of a web server and a file transport protocol server.

19. A non-transient computer-readable storage medium comprising instructions for downloading one or more chunks of a selected media file to a client computing device, wherein execution of the instructions by one or more processors of the client computing device causes the one or more processors to carry out the steps of:
    identifying a pre-selected client-side chunk time interval for media playback on the client computing device;
    receiving input selecting a media segment;
    identifying a location of a selected media file containing the media segment; and
    identifying a location of a metadata file associated with the selected media file, the metadata file specifying how the media file may be chunked according to different chunk sizes based on the encoding scheme of the media file;
    downloading the metadata file;
    determining, based on the metadata file and the media segment, a portion of the selected media file to download, wherein the portion of the selected media file has a time offset, and wherein a time duration of the portion of the selected media file is greater than or equal to that of one or more chunks;
    downloading the portion of the selected media file;
    preparing one or more local media files from the portion of the selected media file, wherein each local media file includes one chunk; and
    determining, based on the metadata file, a suitable header for each local media file, and prepending the each header to each local media file;
    wherein pre-selected client-side chunk time interval is identified in absence of input from the server;
    wherein the pre-selected client-side chunk time interval is specific to the type of client computing device, and
    wherein the pre-selected client-side chunk time interval is based on a relationship between chunk time interval and playback quality for the type of client computing device.

* * * * *